United States Patent
Ho et al.

(10) Patent No.: US 10,647,382 B2
(45) Date of Patent: May 12, 2020

(54) CHARGE SYSTEM AND CHARGE METHOD

(71) Applicant: Giant Manufacturing Co., Ltd., Taichung (TW)

(72) Inventors: Wei-Chieh Ho, Taichung (TW); Chia-Wei Lin, Taichung (TW); Chao-Shun Yang, Taichung (TW)

(73) Assignee: Giant Manufacturing Co., Ltd., Taichung (TW)

( * ) Notice: Subject to any disclaimer, the term of this patent is extended or adjusted under 35 U.S.C. 154(b) by 679 days.

(21) Appl. No.: 15/389,453

(22) Filed: Dec. 23, 2016

(65) Prior Publication Data
US 2017/0341706 A1   Nov. 30, 2017

(30) Foreign Application Priority Data
May 30, 2016   (TW) .............................. 105116808 A

(51) Int. Cl.
*B62M 7/12*   (2006.01)
*B60L 1/00*   (2006.01)
(Continued)

(52) U.S. Cl.
CPC ................. *B62M 7/12* (2013.01); *B60L 1/00* (2013.01); *B62J 6/001* (2013.01); *B62J 6/12* (2013.01);
(Continued)

(58) Field of Classification Search
CPC .. B62M 7/12; H02J 7/1407; B62J 6/12; B62J 6/001; B60L 1/00; B60L 2200/12
See application file for complete search history.

(56) References Cited

U.S. PATENT DOCUMENTS 3,753,000 A * 8/1973 Newman ................... B62J 6/003
307/9.1
5,247,430 A * 9/1993 Schwaller ................ B62J 6/003
315/78
(Continued)

FOREIGN PATENT DOCUMENTS

CN         104333105          2/2015
DE       202008018445         7/2014
(Continued)

OTHER PUBLICATIONS

"Search Report of Europe Counterpart Application", dated Nov. 7, 2017, p. 1-p. 7.
(Continued)

*Primary Examiner* — Hal Kaplan
*Assistant Examiner* — Terrence R Willoughby
(74) *Attorney, Agent, or Firm* — JCIPRNET

(57) ABSTRACT

A charge system and a charge method adapted to a bicycle are provided. The charge system includes a hub dynamo, a power apparatus, a sensor and a control apparatus. The control apparatus is coupled to the hub dynamo, the power apparatus and the sensor. The sensor is adapted to sense a riding condition of the bicycle. According to the riding condition, the control apparatus selects a power supply pattern of the hub dynamo. When the power supply pattern is selected to be a stop pattern, a connection loop between the hub dynamo and the power apparatus is turned off by the control apparatus. When the power supply pattern is selected to a first pattern, the connection loop between the hub dynamo and the power apparatus is turned on by the control apparatus, such that the hub dynamo supplies power to the power apparatus at a first rate.

14 Claims, 3 Drawing Sheets

(51) Int. Cl.
*B62J 6/00* (2020.01)
*B62J 6/12* (2006.01)
*H02J 7/14* (2006.01)

(52) U.S. Cl.
CPC ......... *H02J 7/1407* (2013.01); *B60L 2200/12* (2013.01)

(56) References Cited

U.S. PATENT DOCUMENTS

| | | | |
|---|---|---|---|
| 6,260,649 B1 * | 7/2001 | Carney, Jr. ................ | B60L 7/12 180/220 |
| 7,150,332 B2 * | 12/2006 | Edmonds, Jr. ........... | B62M 6/45 180/65.1 |
| 2003/0073546 A1 * | 4/2003 | Lassanske .......... | A63B 21/0053 482/63 |
| 2005/0275978 A1 | 12/2005 | Kitamura | |
| 2008/0023234 A1 * | 1/2008 | Wang .................... | B62D 59/04 180/14.2 |
| 2013/0001000 A1 * | 1/2013 | Krieger ................... | B62M 6/45 180/206.3 |
| 2016/0096493 A1 * | 4/2016 | Suzuki .................... | B62M 6/45 320/162 |
| 2017/0151991 A1 * | 6/2017 | Hur | |

FOREIGN PATENT DOCUMENTS

| | | |
|---|---|---|
| EP | 1465317 | 10/2004 |
| EP | 1488991 | 12/2004 |
| JP | H11139368 | 5/1999 |
| TW | 201605667 | 2/2016 |

OTHER PUBLICATIONS

"Office Action of Taiwan Counterpart Application," dated May 8, 2017, p. 1-p. 8.
"Office Action of China Counterpart Application," dated Oct. 22, 2019, p. 1-p. 10.

* cited by examiner

CHARGE SYSTEM AND CHARGE METHOD

CROSS-REFERENCE TO RELATED APPLICATION

This application claims the priority benefit of Taiwan application serial no. 105116808, filed on May 30, 2016. The entirety of the above-mentioned patent application is hereby incorporated by reference herein and made a part of this specification.

BACKGROUND OF THE INVENTION

Field of the Invention

The invention relates to a charge system and a charge method, and particularly relates to a charge system and a charge method adapted to a bicycle.

Description of Related Art

Along with development of technology and usage demands, more and more electronic apparatuses are proposed to provide more complete and comprehensive bicycle riding experiences. For example, a navigation device or a mobile phone having a navigation function is generally applied to guide a rider with a right riding road and avoid roads with poor traffic conditions. Especially, the navigation device or the mobile phone may record a route and a riding detail of the rider. For another example, in case of a night time or a poor weather condition, a headlight and a taillight may provide the rider with a better field of vision.

However, when the aforementioned electronic apparatuses are used, the rider has to confirm whether these electronic apparatuses have enough power in advance. In case of careless negligence, the electronic apparatuses probably cannot be used due to lack of power. In order to resolve the above problem, various power generating devices are combined with the bicycles to convert a riding output of the rider to provide power to the aforementioned electronic apparatuses. To be specific, a hub dynamo is an example.

However, the aforementioned power generating device generally converts the riding output of the rider to provide power constantly, which may cause serious physical exertion of the rider. Therefore, the aforementioned power generating device may cause a poor riding experience to the rider pursuing sport efficiency or performing high intensity sports.

SUMMARY OF THE INVENTION

The invention is directed to a charge system and a charge method adapted to bicycle, which are adapted to dynamically adjust a power supply pattern of a hub dynamo according to a riding condition of a bicycle, such that a rider of the bicycle may enjoy a better riding experience.

An embodiment of the invention provides a charge system, which is adapted to a bicycle. The charge system includes a hub dynamo, a power apparatus, a sensor and a control apparatus. The control apparatus is coupled to the hub dynamo, the power apparatus and the sensor. The sensor is adapted to sense a riding condition of the bicycle. The control apparatus selects a power supply pattern of the hub dynamo according to the riding condition of the bicycle. When the power supply pattern of the hub dynamo is selected to be a stop pattern, the control apparatus turns off a connection loop between the hub dynamo and the power apparatus. When the power supply pattern of the hub dynamo is selected to be a first pattern, the control apparatus turns on the connection loop between the hub dynamo and the power apparatus, such that the hub dynamo supplies power to the power apparatus at a first rate.

An embodiment of the invention provides a charge method, which is adapted to a bicycle having a hub dynamo and a power apparatus. The charge method includes following steps. A riding condition of the bicycle is sensed. A power supply pattern of the hub dynamo is selected according to the riding condition of the bicycle. When the power supply pattern of the hub dynamo is selected to be a stop pattern, a connection loop between the hub dynamo and the power apparatus is turned off. When the power supply pattern of the hub dynamo is selected to be a first pattern, the connection loop between the hub dynamo and the power apparatus is turned on, such that the hub dynamo supplies power to the power apparatus at a first rate.

According to the above description, in the charge system and charge method provided by the invention, by sensing a riding condition of the rider riding the bicycle, it is determined whether to turn on the connection loop between the hub dynamo and the power apparatus to supply power to the power apparatus. In detail, the power supply pattern of the hub dynamo can be selected to be the stop pattern or the first pattern according to the riding condition of the rider, so as to dynamically adjust an exertion level of the rider on the hub dynamo, and accordingly provide a better riding experience.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
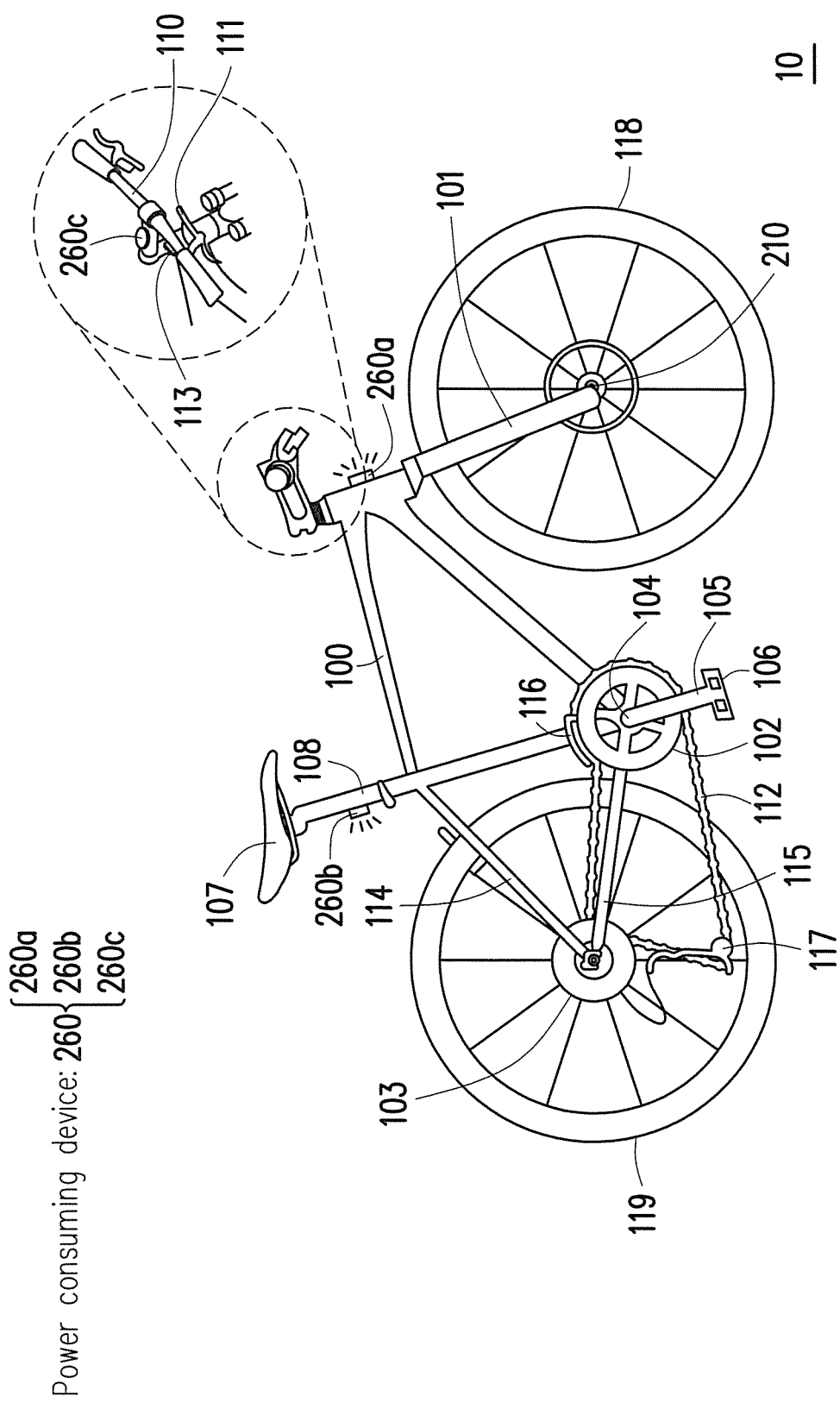
FIG. 1 is a schematic diagram of a bicycle according to an embodiment of the invention.

FIG. 1 is a schematic diagram of a bicycle according to an embodiment of the invention. Referring to FIG. 1, the bicycle 10 includes a frame 100, a front fork 101, a seat stay 114, a chain stay 115, a front chain wheel 102, a back chain wheel 103, a crank shaft 104, a crank 105, a pedal 106, a saddle 107, a seatpost 108, a handlebar 110, a brake lever 111, a chain 112, a front wheel 118, a back wheel 119. On the other hand, a variable-speed gear of the bicycle 10 is, for example, composed of a shift lever set 113, a front derailleur 116, a rear derailleur 117, etc., though the invention is not limited thereto. In an embodiment of the invention, the bicycle 10 further includes a hub dynamo 210 (which is disposed on an axle at a wheel center) and a plurality of power consuming devices 260. The hub dynamo 210 is, for example, correspondingly set at the front wheel 118 or the back wheel 119, and the power consuming devices 260 are, for example, a front light 260a, a back light 260b or a charge dock 260c, which is not limited by the invention. An external electronic apparatus is, for example, connected to the charge dock 260c through a universal serial bus (USB) for receiving a power supply.

Figure 2:
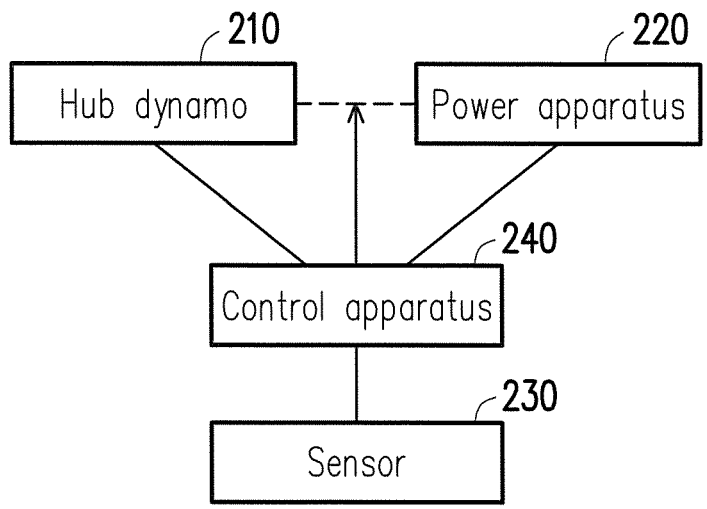
FIG. 2 is a block diagram of a charge system according to an embodiment of the invention.

FIG. 2 is a block diagram of a charge system according to an embodiment of the invention. The charge system 200a of the present embodiment is adapted to the bicycle 10 of FIG. 1, though the invention is not limited thereto. Referring to FIG. 2, the charge system 200a includes a hub dynamo 210, a power apparatus 220, a sensor 230 and a control apparatus 240. The control apparatus 240 is coupled to the hub dynamo 210, the power apparatus 220 and the sensor 230.

In an embodiment of the invention, the hub dynamo 210 is, for example, a magnetoresistive hub dynamo, though the type of the hub dynamo 210 is not limited by the invention. To be specific, the magnetoresistive hub dynamo supplies power based on a magnetoelectric conversion technique. Generally, when the hub dynamo 210 does not supply power, a rolling resistance of the hub dynamo 210 is similar to a general hub. On the other hand, when the hub dynamo 210 generates power, along with increase of a supplying rate, the rolling resistance is correspondingly increased.

In an embodiment of the invention, the power apparatus 220 is, for example, a power apparatus suitable for being repeatedly charged and discharged. The power consuming devices 260 are coupled to the power apparatus 220, and obtain corresponding power supply from the power apparatus 220.

In an embodiment of the invention, the sensor 230, for example, includes a gravity sensor, an accelerometer, a gyroscope, an electronic compass, or a similar device, though the invention is not limited thereto. In the present embodiment, by using the sensor 230, a riding condition, for example, acceleration or deceleration of the bicycle 10 can be sensed.

In an embodiment of the invention, the control apparatus 240, for example, includes a micro-controller, an embedded controller, a central processing unit (CPU), a field programmable gate array (FPGA), an application-specific integrated circuit (ASIC), or a similar device, though the invention is not limited thereto.

In an embodiment of the invention, under control of the control apparatus 240, the power apparatus 220 may selectively receive the power provided by the hub dynamo 210 for charging. To be specific, the control apparatus 240, for example, turns on or turns off a connection loop between the power apparatus 220 and the hub dynamo 210 to control a power supply operation between the hub dynamo 210 and the power apparatus 220. In an embodiment of the invention, the control apparatus 240 may change a load magnitude of the power apparatus 220 on the connection loop to adjust a power supply rate of the hub dynamo 210.

Figure 3:
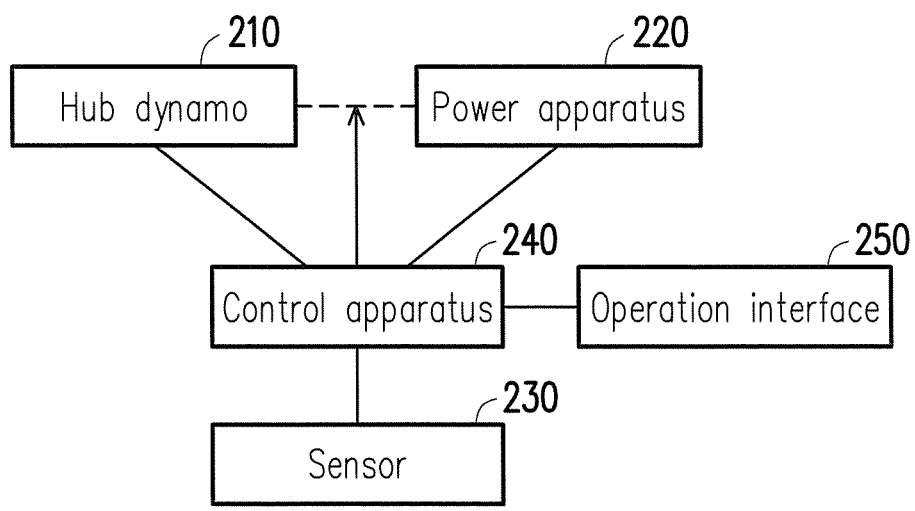
FIG. 3 is a block diagram of a charge system according to another embodiment of the invention.

FIG. 3 is a block diagram of a charge system according to another embodiment of the invention. The charge system 200b of the present embodiment is adapted to the bicycle 10 of FIG. 1, though the invention is not limited thereto. Compared to the charge system 200a of FIG. 2, the charge system 200b further includes an operation interface 250 coupled to the control apparatus 240. In an embodiment of the invention, the operation interface 250 is, for example, a button, a keyboard, a mouse, a touch panel, or a similar device having an input function.

In an embodiment of the invention, the power apparatus 220, the sensor 230 and the control apparatus 240 are, for example, integrated into a single apparatus, and set on the frame 110 or in internal of the frame 100, though the invention is not limited thereto. In another embodiment of the invention, the power apparatus 220, the sensor 230, the control apparatus 240 and the operation interface 250 are, for example, individual apparatuses, and are respectively set on the frame 100, the front fork 101, the seat stay 114, the chain stay 115, the handlebar 110, etc., though the invention is not limited thereto.

In an embodiment of the invention, the charge systems 200a, 200b determine whether to turn on the connection loop between the hub dynamo 210 and the power apparatus 220 to supply power according to a riding condition of the bicycle. To be specific, when the hub dynamo 210 supplies power to the power apparatus 220, a rolling resistance thereof is changed along with a power supply rate, which probably influences a riding experience of the rider riding the bicycle. Therefore, the sensor 230 and the control apparatus 240 may determine whether to enable the hub dynamo 210 to generate power according to the riding condition of the bicycle.

Figure 4:
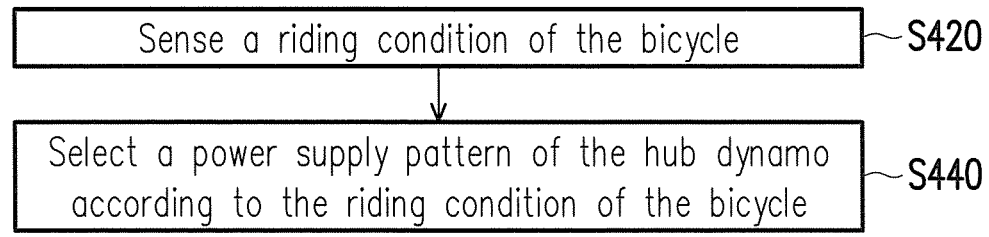
FIG. 4 is a flowchart illustrating a charge method according to an embodiment of the invention.

FIG. 4 is a flowchart illustrating a charge method according to an embodiment of the invention. The charge method of FIG. 4 is adapted to the charge systems 200a and 200b of FIG. 2 and FIG. 3, though the invention is not limited thereto. Referring to FIG. 4, the sensor 230 first senses a riding condition of the bicycle 10 (step S420). Then the control apparatus 240 selects a power supply pattern of the hub dynamo 210 according to the riding condition of the bicycle 10 (step S440).

Figure 5:
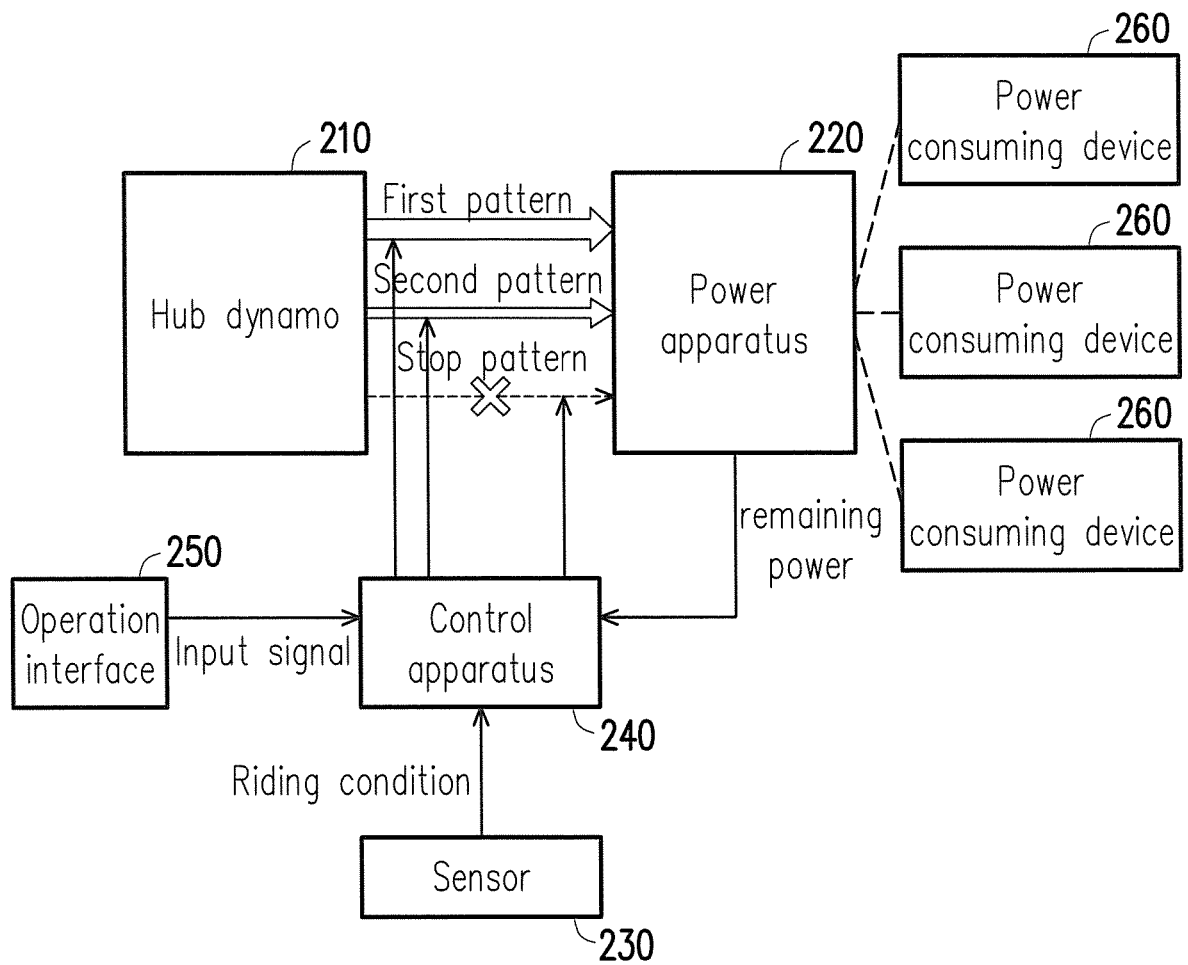
FIG. 5 is an operation schematic diagram of a charge system according to an embodiment of the invention.

FIG. 5 is an operation schematic diagram of a charge system according to an embodiment of the invention. Referring to FIG. 2 to FIG. 5, in an embodiment of the invention, the power supply pattern of the hub dynamo 210 is, for example, a stop pattern or a first pattern, though the invention is not limited thereto. When the power supply pattern of the hub dynamo 210 is selected to be the stop pattern, the control apparatus 240 turns off a connection loop between the hub dynamo 210 and the power apparatus 220. Now, the hub dynamo 210 cannot supply power to the power apparatus 220, and the rolling resistance thereof is similar to a general hub. On the other hand, when the power supply pattern of the hub dynamo 210 is selected to be the first pattern, the control apparatus 240 turns on the connection loop between the hub dynamo 210 and the power apparatus 220, such that the hub dynamo 210 supplies power to the power apparatus 220 at a first rate.

It should be noted that in another embodiment of the invention, the power supply pattern of the hub dynamo 210, for example, further includes a second pattern. To be specific, when the power supply pattern of the hub dynamo 210 is selected to be the second pattern, the control apparatus 240 turns on the connection loop between the hub dynamo 210 and the power apparatus 220, such that the hub dynamo 210 supplies power to the power apparatus 220 at a second rate. In the present embodiment, the second rate is lower than the first rate, though the invention is not limited thereto. The first rate is, for example, 6 watts, and the second rate is, for example, 3 watts.

The power supply rate of the hub dynamo 210 can be adjusted though the control apparatus 240 and the power apparatus 220. Generally, the greater the power supply rate of the hub dynamo 210 is, the larger the rolling resistance thereof is. In other words, by setting the first pattern and the second pattern, the charge systems 200a, 200b may also dynamically adjust the rolling resistance of the hub dynamo 210 according to the riding condition of the rider on the bicycle 10, such that the rider may ride the bicycle 10 in different sport purposes or road conditions. A plurality of embodiments is provided below to describe how the charge systems 200a, 200b adjust the power supply pattern of the hub dynamo 210 according to the riding condition of the bicycle.

In an embodiment of the invention, the riding condition of the bicycle 10, for example, relates to a moving speed of the bicycle 10. To be specific, through the sensor 230, the charge system 200a, 200b may determine whether the bicycle 10 is accelerated, decelerated, or maintained to a constant velocity. When the riding condition indicates that the bicycle 10 is accelerated, the control apparatus 240 selects the power supply pattern of the hub dynamo 210 to be the stop pattern. In the present embodiment, when the riding condition indicates that the bicycle 10 is accelerated, it represents that the rider wants to accelerate a riding speed. In this case, the rider requires consuming more energy, and the control apparatus 240 selects the power supply pattern of the hub dynamo 210 to be the stop pattern, such that the rider may accelerate the riding speed easily.

On the other hand, when the riding condition indicates that the bicycle 10 is decelerated, the control apparatus 240 selects the power supply pattern of the hub dynamo 210 to be the first pattern. In the present embodiment, when the riding condition indicates that the bicycle 10 is decelerated, it represents that the rider probably wants to decrease the riding speed. In this case, the control apparatus 240 selects the power supply pattern of the hub dynamo 210 to be the first pattern, so as to convert excess energy of the rider to the power supply. Further, the rider may also use the rolling resistance of the hub dynamo 210 to assist decelerating.

In an embodiment of the invention, when the riding condition indicates that the bicycle 10 is only maintained at a speed section, and there is no specific intent to accelerate or decelerate, the control apparatus 240 selects the power supply pattern of the hub dynamo 210 to be the second pattern.

In another embodiment of the invention, the riding condition of the bicycle 10, for example, relates to a road condition of the bicycle 10. To be specific, through the sensor 230, the charge systems 200a, 200b may determine whether the bicycle 10 is running uphill or downhill. When the riding condition indicates that the bicycle 10 is running uphill, it represents that the rider requires larger energy to climb. In this case, the control apparatus 240 selects the power supply pattern of the hub dynamo 210 to be the stop pattern to decrease the rolling resistance of the hub dynamo 210.

Comparatively, when the riding condition indicates that the bicycle 10 is running downhill, the excess energy of the rider or the bicycle 10 can be used on power supply of the hub dynamo 210. In this case, the control apparatus 240 selects the power supply pattern of the hub dynamo 210 to be the first pattern, such that the increasing roller resistance will not cause too much interference to the rider.

In an embodiment of the invention, when the riding condition indicates that the bicycle 10 is running on a flat road, the control apparatus 240 selects the power supply pattern of the hub dynamo 210 to be the second pattern. In the present embodiment, the flat road refers to a road section with a slope not exceeding a fixed angle, for example, a road section with a slope not exceeding 2 degrees, though the invention is not limited thereto.

According to the aforementioned embodiments, it is known that the control apparatus 240 selects the power supply pattern of the hub dynamo 210 based on different riding conditions of the bicycle 10. The aforementioned riding conditions includes acceleration of the bicycle 10, deceleration of the bicycle 10 and uphill or downhill of the road section whereon the bicycle 10 is running. It should be noted that in an embodiment of the invention, as long as the control apparatus 240 does not select the power supply pattern of the hub dynamo 210 to be the first pattern or the stop pattern according to the riding condition of the bicycle 10, the control apparatus 240 automatically selects the power supply pattern of the hub dynamo 210 to be the second pattern.

Besides according to the riding condition of the bicycle 10, in an embodiment of the invention, the charge systems 200a, 200b may further decide the power supply pattern of the hub dynamo 210 according to an amount of the power remaining in the power apparatus 220. Referring to FIG. 2-FIG. 5, in the present embodiment, when the remaining power of the power apparatus 220 is increased to an upper limit, for example, 90% or 95% of a total battery capacity, the control apparatus 240 selects the power supply pattern of the hub dynamo 210 to be the stop pattern. To be specific, since the power apparatus 220 has stored enough electric quantity, the control apparatus 240 turns off the connection loop between the hub dynamo 210 and the power apparatus 220, such that the rolling resistance of the hub dynamo 210 is decreased to avoid influencing the riding experience of the rider.

On the other hand, when the remaining power of the power apparatus 220 is decreased to a lower limit, for example, 5% or 10% of the total battery capacity, the control apparatus 240 selects the power supply pattern of the hub dynamo 210 to be the first pattern or the second pattern, and turns on the connection loop between the hub dynamo 210 and the power apparatus 220. In this way, the hub dynamo 210 may supply power to the power apparatus 200 to avoid insufficient electric quantity.

In an embodiment of the invention, the charge system 200b, for example, determines the power supply pattern of the hub dynamo 210 according to a selection of the rider. Referring to FIG. 3-FIG. 5, in the present embodiment, the rider, for example, selects the power supply pattern of the hub dynamo 210 through the operation interface 250. The control apparatus 240 receives an input signal from the operation interface 250, and selects the power supply pattern of the hub dynamo 210 to be the stop pattern, the first pattern or the second pattern according to the input signal. In this way, the rider may freely adjust a charge timing of the power apparatus 200.

It should be noted that in another embodiment, the control apparatus 240 can be replaced by a pure mechanical structure. The mechanical structure is, for example, controlled by the power apparatus 220, the sensor 230 or the input interface 250, etc. to selectively turn on the connection loop between the hum dynamo 210 and the power apparatus 220. A possible mechanical structure is a switch structure, though the invention is not limited thereto. For example, when the power supply pattern of the hub dynamo 210 is the stop pattern, the mechanical structure is turned off to turn off the connection loop between the hum dynamo 210 and the power apparatus 220. On the other hand, when the power supply pattern of the hub dynamo 210 is the first pattern, the mechanical structure turns on the connection loop between the hum dynamo 210 and the power apparatus 220, such that the hub dynamo 210 supplies power to the power apparatus 220 at the first rate.

In summary, in the charge system and charge method provided by the invention, by sensing a riding condition of the rider riding the bicycle, it is determined whether to turn on the connection loop between the hub dynamo and the power apparatus to supply power to the power apparatus. In detail, the power supply pattern of the hub dynamo can be selected to be the stop pattern or the first pattern according to the riding condition of the rider, so as to dynamically adjust an exertion level of the rider on the hub dynamo, and accordingly provide a better riding experience.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A charge system, adapted to a bicycle, the charge system comprising:
    a hub dynamo;
    a power apparatus;
    a sensor, adapted to sense a riding condition of the bicycle; and
    a control apparatus, coupled to the hub dynamo, the power apparatus and the sensor, and selecting a power supply pattern of the hub dynamo according to the riding condition of the bicycle,
    wherein when the power supply pattern of the hub dynamo is selected to be a stop pattern, the control apparatus turns off a connection loop between the hub dynamo and the power apparatus, and when the power supply pattern of the hub dynamo is selected to be a first pattern, the control apparatus turns on the connection loop between the hub dynamo and the power apparatus, such that the hub dynamo supplies power to the power apparatus at a first rate.

2. The charge system as claimed in claim 1, wherein when the riding condition indicates that the bicycle is accelerated, the control apparatus selects the power supply pattern of the hub dynamo to be the stop pattern; and when the riding condition indicates that the bicycle is decelerated, the control apparatus selects the power supply pattern of the hub dynamo to be the first pattern.

3. The charge system as claimed in claim 1, wherein when the riding condition indicates that the bicycle is running uphill, the control apparatus selects the power supply pattern of the hub dynamo to be the stop pattern; and when the riding condition indicates that the bicycle is running downhill, the control apparatus selects the power supply pattern of the hub dynamo to be the first pattern.

4. The charge system as claimed in claim 1, wherein when the power supply pattern of the hub dynamo is selected to be a second pattern, the control apparatus turns on the connection loop between the hub dynamo and the power apparatus, such that the hub dynamo supplies power to the power apparatus at a second rate, wherein the second rate is lower than the first rate.

5. The charge system as claimed in claim 4, wherein the riding condition indicates that the bicycle is maintained at a speed section, the control apparatus selects the power supply pattern of the hub dynamo to be the second pattern, when the riding condition indicates that the bicycle is running on a flat road, the control apparatus selects the power supply pattern of the hub dynamo to be the second pattern.

6. The charge system as claimed in claim 1, wherein when an amount of the power remaining in the power apparatus is increased to an upper limit, the control apparatus selects the power supply pattern of the hub dynamo to be the stop pattern; and
    when the amount of the power remaining in the power apparatus is decreased to a lower limit, the control apparatus selects the power supply pattern of the hub dynamo to be the first pattern.

7. The charge system as claimed in claim 1, further comprising:
    an operation interface, coupled to the control apparatus, and receiving an input signal,
    wherein the control apparatus selects the power supply pattern of the hub dynamo according to the input signal.

8. A charge method, adapted to a bicycle having a hub dynamo, a power apparatus, a sensor and a control apparatus coupled to the hub dynamo, the power apparatus and the sensor, the charge method comprising:
    sensing, by the sensor, a riding condition of the bicycle; and
    selecting, by the control apparatus, a power supply pattern of the hub dynamo according to the riding condition of the bicycle,
    wherein when the power supply pattern of the hub dynamo is selected to be a stop pattern, a connection loop between the hub dynamo and the power apparatus is turned off by the control apparatus; and when the power supply pattern of the hub dynamo is selected to be a first pattern, the connection loop between the hub dynamo and the power apparatus is turned on by the control apparatus, such that the hub dynamo supplies power to the power apparatus at a first rate.

9. The charge method as claimed in claim 8, wherein the step of selecting the power supply pattern of the hub dynamo comprises:
    selecting the power supply pattern of the hub dynamo to be the stop pattern when the riding condition indicates that the bicycle is accelerated; and
    selecting the power supply pattern of the hub dynamo to be the first pattern when the riding condition indicates that the bicycle is decelerated.

10. The charge method as claimed in claim 8, wherein the step of selecting the power supply pattern of the hub dynamo comprises:
    selecting the power supply pattern of the hub dynamo to be the stop pattern when the riding condition indicates that the bicycle is running uphill; and
    selecting the power supply pattern of the hub dynamo to be the first pattern when the riding condition indicates that the bicycle is running downhill.

11. The charge method as claimed in claim 8, wherein when the power supply pattern of the hub dynamo is selected to be a second pattern, the connection loop between the hub dynamo and the power apparatus is turned on, such that the hub dynamo supplies power to the power apparatus at a second rate, wherein the second rate is lower than the first rate.

12. The charge method as claimed in claim 11, wherein the step of selecting the power supply pattern of the hub dynamo comprises:

selecting the power supply pattern of the hub dynamo to be the second pattern when the riding condition indicates that the bicycle is maintained at a speed section; and selecting the power supply pattern of the hub dynamo to be the second pattern when the riding condition indicates that the bicycle is running on a flat road.

13. The charge method as claimed in claim 8, comprising:

selecting the power supply pattern of the hub dynamo to be the stop pattern when an amount of the power remaining in the power apparatus is increased to an upper limit; and selecting the power supply pattern of the hub dynamo to be the first pattern when the amount of the power remaining in the power apparatus is decreased to a lower limit.

14. The charge method as claimed in claim 8, comprising:

receiving an input signal; and selecting the power supply pattern of the hub dynamo according to the input signal.

\* \* \* \* \*